United States Patent [19]

Glazebrook

[11] Patent Number: 5,280,806
[45] Date of Patent: Jan. 25, 1994

[54] EXCESS FLOW VALVE

[75] Inventor: Richard J. Glazebrook, The Park, England

[73] Assignee: Gaslow International Limited, Chilwell, England

[21] Appl. No.: 926,536

[22] Filed: Aug. 5, 1992

[30] Foreign Application Priority Data

Aug. 6, 1991 [GB] United Kingdom ............... 9116935

[51] Int. Cl.⁵ ............................................. F16K 17/28
[52] U.S. Cl. ........................................ 137/517; 251/65
[58] Field of Search ........................... 137/517; 251/65

[56] References Cited

U.S. PATENT DOCUMENTS

| | | | |
|---|---|---|---|
| 2,569,316 | 9/1951 | Jerman | 251/65 X |
| 2,597,952 | 5/1952 | Rosenlund | 251/65 X |
| 3,159,167 | 12/1964 | Mueller et al. | 137/517 X |
| 3,468,338 | 9/1969 | Patterson | 137/517 |
| 3,921,662 | 11/1975 | Hauffe et al. | 137/517 |
| 4,874,012 | 10/1989 | Velie | 137/557 |

Primary Examiner—Robert G. Nilson
Attorney, Agent, or Firm—Quarles & Brady

[57] ABSTRACT

An excess flow valve comprising a valve body defining a passage for a flow of fluid therethrough, the passage having an inlet and an outlet for fluid, a magnetically attractable closure member movably located within the passage for movement toward and away from the outlet, a seat located adjacent to the outlet for receiving the closure member. A flow restriction assembly is located in the passage for defining at least two flow paths for fluid along the passage, the flow restriction assembly including a retaining member comprising a permanent magnet for retaining the closure member in one of the flow paths and away from the seat whilst there is a flow rate of fluid through the passage which is less than a predetermined rate, the retaining member releasing the closure member when the flow rate of fluid through the passage equals or exceeds the predetermined rate so that the closure member moves toward the outlet to engage the seat and shut off flow of fluid through the outlet.

14 Claims, 2 Drawing Sheets

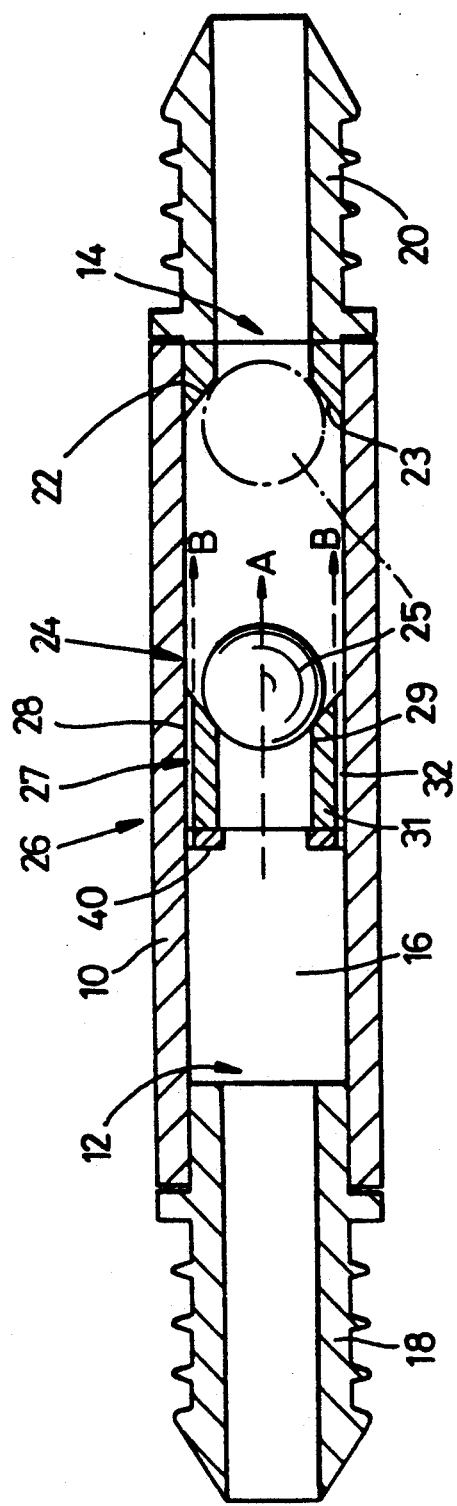
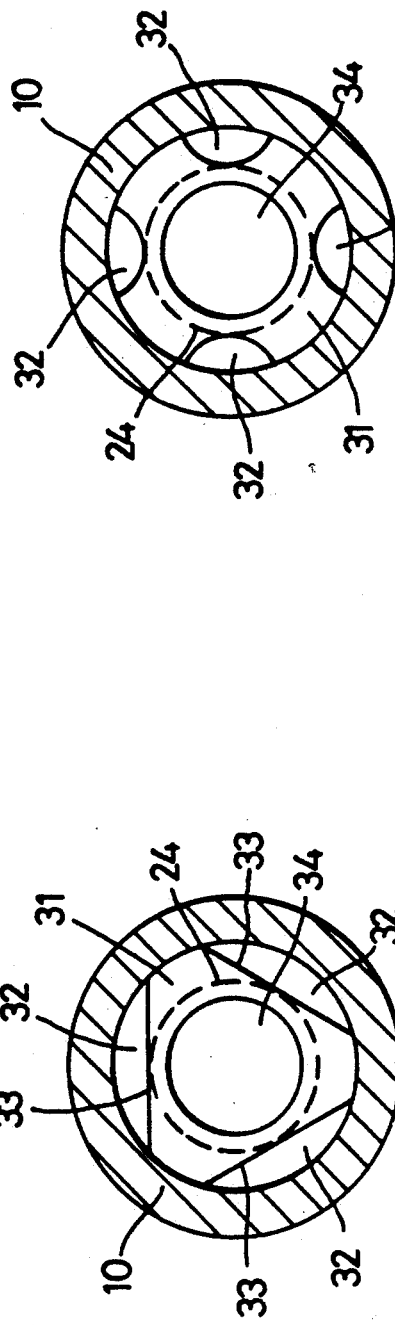
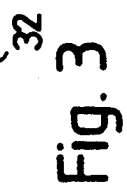

EXCESS FLOW VALVE

BACKGROUND OF THE INVENTION

The present invention relates to excess flow valves used to prevent a flow of fluid through a port from exceeding a predetermined rate of flow.

Excess flow valves are, for example, commonly used in gas delivery systems, the excess flow valve being situated between the gas supply and the appliance using the gas, such that in the event of damage to or rupture of a pipe downstream of the excess flow valve resulting in an escape of gas, the valve will be operative to isolate the gas supply from the point of escape. In such circumstances, the valve responds to a substantial increase in flow rate.

These known excess flow valves rely upon a substantial increase in flow rate for triggering the valve to shut-off flow and so are normally located in high pressure systems.

Gas supply systems often include a bottle, or other high pressure gas source, connected to a pipe or similar means which is capable of delivering gas at high pressure to a regulator which supplies the gas at a low pressure to a low pressure part of the gas delivery system. Typically the pressure on the high pressure side varies between 10 to 250 psi (0.69 bar to 17.25 bar) and the pressure on the low pressure side varies between 28-50 millibar.

Provision of the valve on the low pressure side of the regulator does confer a number of advantages over well known systems located on the high pressure side.

It is also known to use mains gas appliances such as barbecues and lamps for outdoor use, and such as cookers and heaters for indoor use where the unintentional disconnection of apparatus or break in a gas pipe can be dangerous. Gas supplied in this context is at a relatively low pressure, typically 20 millibar, and thus high pressure excess flow valves are unsuitable in this application.

The present invention is directed toward the provision of an excess flow valve capable of being responsive to a predetermined increase in flow rate at low flow rate values and so can be used on the low pressure side of a gas delivery system. Such a valve may also be used in high pressure systems to respond to increase in flow above a predetermined low flow rate. Throughout the specification, it is intended that reference to the action of "shut-off" of the gas flow includes the situation where the gas flow is not completely shut-off, but substantially reduced to a small flow, whether said small flow is of a predetermined quantity or not.

An advantage of the present invention is that in a liquefied gas system the same excess flow valve may be used on the low pressure side of a delivery system for different gases which have different pressures on the high pressure side of the regulator and would thus otherwise each require high pressure excess flow valves of a different specification. In the particular example of butane and propane gas delivery systems, the regulated pressure on the low pressure side of the system is normally required to be essentially the same, whereas on the high pressure side of the regulator, the pressure will be substantially different for the two gases, thus requiring different types of high pressure excess flow valves.

The pressure in a gas bottle is also subject to fall as the quantity of gag remaining falls, and it is known that this can cause a substantial change in the flow rate permitted by an excess flow valve situated on the high pressure side of the regulator. The present invention also overcomes this problem.

It is further known that variations in temperature of the gas bottle can cause considerable changes in pressure within the bottle, with consequent changes to the flow rate permitted by an excess flow valve situated on the high pressure side of the regulator. The present invention also overcomes this problem.

It is further known that once the gas pressure in the bottle has fallen below a certain level, some excess flow valves situated on the high pressure side of the regulator may not function at all. In one particular example, when a system is used in conjunction with an Automatic Changeover device, the pressure may be allowed to fall to a level below which the excess flow valve will operate. The present invention also overcomes this problem.

A further known disadvantage of excess flow valves situated on the high pressure side of the regulator is that upon first allowing gas into an empty pipe, there is a surge of gas through the system which commonly causes the excess flow valve to operate, preventing further filling of the gas pipe. In this instance, the excess flow valve may need to be reset several times, or manually over-ridden during this initial pipe filling operation. If the excess flow valve is situated on the low pressure side of the regulator, this surge of gas may not occur, or may be very much reduced. Multiple resetting of the valve is thus eliminated or substantially reduced.

A difficulty with situating the excess flow valve on the low pressure side of the delivery system is that the difference between "normal" flow rate and excess flow rate may be small, and a high back pressure from a device downstream of the valve is not expected. The present invention is capable of distinguishing between these small differences of normal flow and excess flow.

A further advantage of the present invention is that it may be utilized in standard gas main pipework where gas is delivered at low pressure and low flow rates and can respond to a small predetermined rise in flow rate in order to shut off supply.

SUMMARY OF THE INVENTION

According to the present invention there is provided an excess flow valve comprising a valve body defining a passage for a flow of fluid therethrough, the passage having an inlet and an outlet for fluid, a magnetically attractable closure member movably located within the passage for movement toward and away from the outlet, a seat located adjacent to the outlet for receiving the closure member, a flow restriction means located in the passage for defining at least two flow paths for fluid along the passage, the flow restriction means including a retaining means comprising a permanent magnet for retaining the closure member in one of said flow paths and away from said seat whilst there is a flow rate of fluid through the passage which is less than a predetermined rate, the retaining means releasing the closure member when the flow rate of fluid through the passage equals or exceeds said predetermined rate so that the closure member moves toward the outlet to engage said seat and shut off flow of fluid through the outlet.

DESCRIPTION OF DRAWINGS

Embodiments of the present invention will now be described by way of example with reference to the accompanying drawings in which:

FIG. 1 shows an axial section of an excess flow valve according to one embodiment of the present invention;

FIGS. 2 and 3 show end elevations of two embodiments of the retaining means of FIG. 1;

DESCRIPTION OF THE PREFERRED EMBODIMENTS

Figure 4:
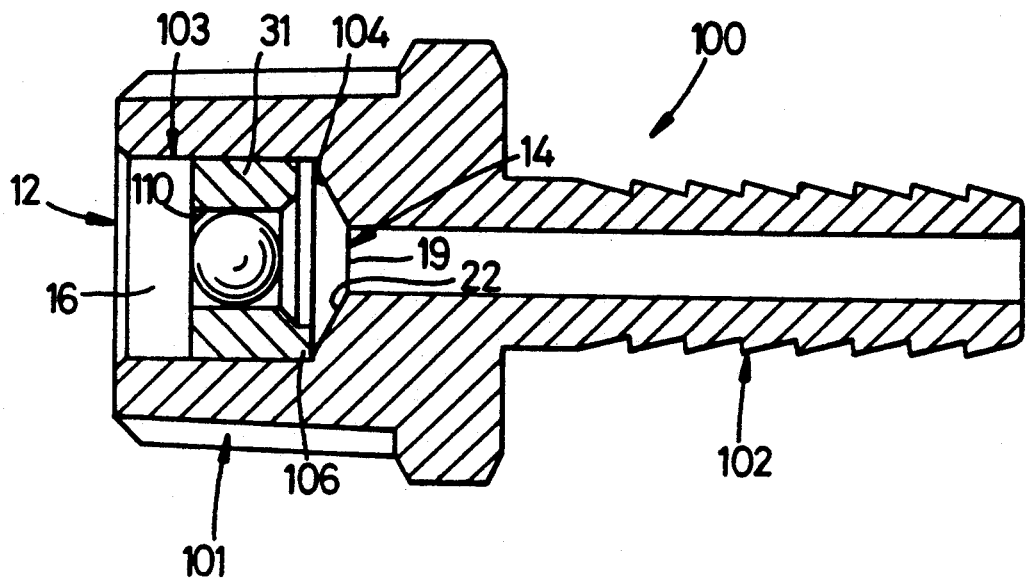
FIG. 4 shows an axial-section of a second embodiment of a valve according to the present invention.

Referring to FIG. 1 there is provided a valve body 10 which defines a substantially cylindrical passage 16 for the flow of gas therethrough. The passage 16 has an inlet 12 and an outlet 14. The body 10 includes couplings 18, 20 inserted into the body 10 for the connection of the valve to suitable pipework. Such couplings are widely available in a number of forms and are not described further. The body may be constructed as a short brass tube, for example, and may form part of another fitting in the gas supply system. For example, the body may be incorporated within the outlet coupling of a regulator (not shown) as used in liquefied gas systems.

Adjacent the outlet 14 there is located a seat 22 for a closure member 24. The seat may be conveniently manufactured integrally with the coupling 20, or may be separate, and forms an annular collar having a circular port 19 coaxial with the passage 16, and defining, on the upstream face of the collar, a bevelled edge 23 which is operative to guide the closure member 24 to a position in which it correctly seats on the collar to close the circular port 19.

Preferably the cross-sectional size of port 19 is such as not to cause a drop in pressure on the downstream side of the valve during normal flow rates of gas.

The closure member 24 is preferably a magnetically attractable ball 25 which is movable within the passage 16 toward and away from the outlet 14. The closure member 24 is maintained on the seat 22 by the gas pressure differential between the inlet 12 and outlet 14 of the passage 16. In this position, the closure member 24 effectively blocks the flow of fluid through the valve body 10.

Upstream of the seat 22 there is provided a flow restriction means 26 which serves to define two or more flow paths A, B along the passage 16. The flow restriction means 26 includes a retaining means 27 which is in the form of a permanent magnet capable of attracting and retaining closure member 24 in flow path A and away from seat 22 whilst flow rate of gas through the valve does not exceed a predetermined value.

The permanent magnet Is preferably a short cylindrical body 31 having a central bore 29 which defines the flow path A, i.e. the body 31 is in cross-section annular.

As shown, the diameter of the ball 25 is larger than the diameter of bore 29 and so it sits on an annular seat 28 located at the axial end of body 31. The seat 28 may be formed separately or be an integral part of the body 31.

The ball 25 may be of a diameter smaller than the bore 29 so as to be retained within the bore 29. In order to ensure that the ball does not run out of the end of bore 29 facing the inlet 12, an annular collar 40 may be provided having a bore which is less than the diameter of the ball 25.

As seen in FIG. 2, the outer periphery of the magnet body 31 engages with the internal wall of bore 29 and passageways 32 which define a plurality of flow paths B which are located between the periphery of the body 31 and the wall of bore 29. In FIG. 2 the passageways 32 are defined by flats 33 formed on the body 31.

The outer periphery of the body 31 preferably frictionally engages the inner wall of passage 16 so as to provide an interference fit.

In FIG. 3, the passageways 32 are formed by grooves, or cut-away sections in body 31 instead of flats 33.

In use, fluid flow entering inlet 12 is divided into paths A and B. Fluid attempting to flow along flow path A is obstructed by the closure member 25 which is retained in flow path A by magnet body 31.

The closure member 25 is thereby exposed to a motive force which will be a combination of forces derived from the pressure differential between the inlet and outlet sides of the ball and a dynamic force derived from the flow of fluid hitting the ball. The motive force when reaching a level sufficiently high to overcome the magnetic attraction of the magnet body 31 on the ball 25 will cause the ball 25 to move along passage 16 to engage the seat 22. Once engaged on seat 22 a large pressure differential between the inlet and outlet sides of the ball will exist which will maintain the ball in contact with the seat 22 until pressure equalisation has occurred.

For a given size of ball 25 and magnet body 31, the sensitivity of the valve can therefore be varied by adjusting the permitted flow rate of fluid along path B. The greater the permitted flow along path B, the higher the flow rate through the valve 10 before movement of the ball to engage seat 22; conversely the smaller the permitted flow along path B the lower the flow rate through the valve 10 before movement of the ball to engage seat 22.

Adjustment of flow rate along path B is conveniently adjusted by varying the number and/or cross-sectional area of passageways 32 in body 31. Alternatively, the body 31 may have a predetermined number of passageways 32 of a cross-sectional area providing a maximum flow rate along path B and a baffle means, such as collar 40, may be provided for restricting access into the passageways 32 to thereby control the amount of fluid permitted to flow therealong. For this purpose, collar 40 may be provided with flats (not shown) on its outer periphery for registry with passageways 32 formed on body 31.

Sensitivity of the valve can also be varied by adjusting the weight of ball 25 and the strength of the magnet for attracting and retaining the ball 25. In this respect it is desirable for a valve which is responsive to increases of flow rate at low supply pressures to have a ball which is as light as possible in order that the magnetic force for retaining the ball can be commensurately small.

Lightness in weight for the ball is also desirable in order to reduce gravitational effects on the ball. In this respect the lighter the ball the less the gravitational force for urging the ball in a direction toward seat 22 should the valve be oriented vertically with the seat 22 beneath ball 25. Accordingly with a light ball there is a smaller reduction in the effective magnetic retention force due to gravity than with a heavier ball and so the power of the magnet may be reduced without adverse affect.

Reduction in weight of ball 25 may be achieved by use of a small ball made of solid metal, for example in a valve for use in propane and butane systems, a steel ball of approximately 3.5 mm diameter having a weight of approximately 0.18 gm has been found suitable. In such an example, the permanent magnet is preferably a plastics moulding containing about 80% by weight ferrite filler which has been magnetised.

Alternatively the ball 25 may be of a hollow metal sphere or a plastics ball coated and/or filled with a magnetically attractable material. Such balls would be lighter compared with a ball of solid metal of the same diameter. Accordingly a larger diameter of hollow ball and/or plastics ball may be used without affecting the need to increase the strength of the magnet.

In the event of an excess flow condition occurring, and the closure member 24 operating to shut off the flow of fluid, the valve may be reset by returning the closure member 24 to the retaining means 26 by the use of a reset magnet (not shown) external to the body of the valve.

The reset magnet may be connected to the body 10 of the valve in some convenient manner. For example, the reset means may comprise a magnetic collar around the body, retained by a spring away from the retaining means and the seat 22 (for example upstream of both), and may be slidably operable down the outside of the body of the valve to return the closure member 24 to the retaining means 26, the spring ensuring that the reset means magnet is kept well clear of the closure member 24 while the valve is in use, and ensuring that the magnet is not lost or removed from the vicinity of the valve.

In a further embodiment of the valve, the use of a clear plastic or glass portion of the body enables visual confirmation of the reset operation.

Figure 5:
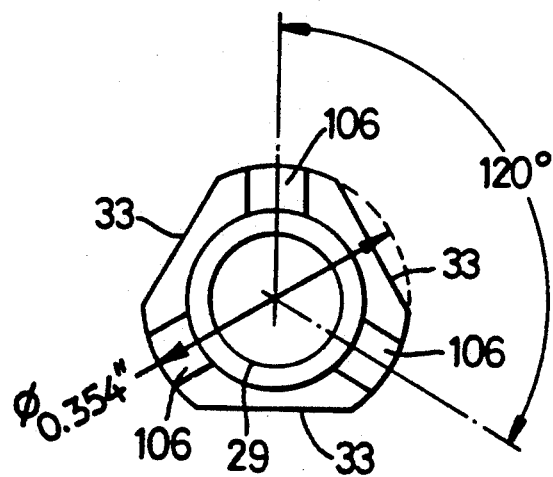
FIG. 5 is an axial end view of the retaining means shown in FIG. 4.

In a presently preferred embodiment 100 shown in FIGS. 4 and 5, an external reset means is not required.

In embodiment 100, the body 10 is in the form of a pipe union having a threaded body portion 101 for connection to a standard pressure regulator (not shown) for a liquefied gas such as butane or propane and a pipe stem 102 onto which a flexible conduit (not shown) can be attached.

The body portion 101 has an internal bore 103 which defines passage 16.

The outlet port 19 is of smaller diameter than bore 103 and the shoulder 104 between bore 103 and port 19 defines an integral seat 22.

The magnet body 31 is provided with axially extending spacing projections 106 on one axial end face. The body 31 is inserted into the bore 103 and pushed along bore 103 until the projections 106 engage the outer periphery of shoulder 104. In this way the body 31 is spaced by a predetermined distance from the seat 22. This distance is chosen such that the seat 22 is located within the magnetic field of attraction of the magnet body 31 so that a ball 25 seated on seat 22 can be magnetically attracted away from the seat 22 when a predetermined low pressure differential exists between the inlet and outlet sides of the ball 25.

A bleed is preferably provided, preferably in the form of deliberate weepage between the ball 25 and seat 22 so that after shut-off i small flow of gas is permitted for equalisation of pressures between the inlet and outlet sides of the ball. Thus when the low pressure differential is reached the valve is automatically reset by the ball 25 being attracted to the body 31.

Preferably the body 31 shown in FIG. 4 includes a small radial projection 110 projecting into bore 103 for preventing the ball 25 from exiting from body 31.

It will be appreciated, as envisaged above, that a ball of larger diameter than the bore 29 of body 31 may be used.

The body 31 is preferably made of a plastics material having a magnetisable filler such as a ferrite. The filler preferably forms 70–90% by weight of the body 31, more preferably about 80% by weight.

In the above embodiments the closure member 24 is a ball. It will be appreciated that other shapes of closure member 24 may be adopted. For example, the closure member 24 may-be in the form of a plunger which is slidably received in bore 29 of body 31 and which has a head for engagement with seat 22. Such a plunger may be made in one piece from a magnetically attractable material and be of solid or hollow construction as envisaged above for ball 25. Alternatively the head portion only of the plunger may be magnetically attractable.

It is envisaged that the valve of the present invention may be utilized in low or high pressure systems for shutting off flow should the flow rate rise above a predetermined low flow rate. The predetermined low flow rate may be within the range up to say about 20 liters per minute. For example, in a butane or propane system, the valve may be adjusted to shut off flow when the flow rate, on the low pressure side, rises above say 14 liters per minute. In a mains supply system, the shut-off flow rate may be set at about 6 liters per minute.

Although the above embodiments have been described in relation to shut-off of gas systems it will be appreciated that the valve of the present invention may be used in liquid supply systems. For example, it is envisaged that the valve may be incorporated in liquid fuel supply systems, say in automobiles, for shutting off fuel supply in the event of a pipe rupture.

I claim:

1. An excess flow valve comprising a valve body defining a passage for a flow of fluid therethrough, the passage having an inlet and an outlet for fluid, a magnetically attractable closure member movably located within the passage for movement toward and away from the outlet, a seat located adjacent to the outlet for receiving the closure member, a flow restriction means located in the passage for defining at least two flow paths for fluid along the passage, said flow restriction means including a retaining means comprising a permanent magnet for retaining the closure member in one of said flow paths and away from said seat whilst there is a flow rate of fluid through the passage which is less than a predetermined rate, the retaining means releasing the closure member when the flow rate of fluid through the passage equals or exceeds said predetermined rate so that the closure member moves toward the outlet to engage said seat and shut off flow of fluid through the outlet, said permanent magnet comprising a body which is annular in cross-section having a central bore defining one of said flow paths and includes one or more passageways passing along the body for defining the remaining flow paths.

2. A valve according to claim 1, wherein the passage is defined by a bore formed in said valve body, the permanent magnet body being located in said bore with its outer periphery in engagement with the internal wall of said bore, said one or more passageways being defined between the outer periphery of the permanent magnet body and the wall of said bore.

3. A valve according to claim 1, wherein the permanent magnet body is spaced from the seat by one or more projections located on an axial end face of the magnet body facing the seat.

4. A valve according to claim 1, wherein the closure member is a ball.

5. A valve according of claim 1, wherein the restriction means includes an annular baffle member for controlling the flow rate of fluid along said passageways.

6. A valve according to claim 2, wherein the permanent magnet body is an interference fit within said bore.

7. A valve according to claim 2, wherein the permanent magnet body is spaced from the seat by one or more projections located on an axial end face of the magnet body facing the seat.

8. A valve according to claim 2, wherein the closure member is a ball.

9. A valve according to claim 2, wherein the restriction means includes an annular baffle member for controlling the flow rate of fluid along said passageways.

10. A valve according to claim 4, wherein the ball is of a diameter substantially the same as or larger than the diameter of said central bore.

11. A valve according to claim 4, wherein the restriction means includes an annular baffle member for controlling the flow rate of fluid along said passageways.

12. A valve according to claim 6, wherein the permanent magnet body is spaced from the seat by one or more projections located on an axial end face of the magnet body facing the seat.

13. A valve according to claim 6, wherein the closure member is a ball.

14. A valve according to claim 6, wherein the, restriction means includes an annular baffle member for controlling the flow rate of fluid along said passageways.

* * * * *

UNITED STATES PATENT AND TRADEMARK OFFICE
CERTIFICATE OF CORRECTION

PATENT NO. : 5,280,806
DATED : January 25, 1994
INVENTOR(S) : Richard J. Glazebrook It is certified that error appears in the above-identified patent and that said Letters Patent is hereby corrected as shown below:

| | |
|---|---|
| Column 1, line 67 | before "remaining" "gag" should read --gas--. |
| Column 3, line 53 | after "magnet" "Is" should read --is--. |
| Column 5, line 61 | before "small" "i" should be --a--. |
| Column 6, line 11 | after "member 24" "may-be" should be --may be--. |
| Column 7, Claim 5, line 1 | before "claim" "of" should be --to--. |

Signed and Sealed this

Twenty-fourth Day of May, 1994

*Attest:*

BRUCE LEHMAN

*Attesting Officer*     *Commissioner of Patents and Trademarks*